United States Patent [19]

Linden et al.

[11] Patent Number: 4,919,181

[45] Date of Patent: Apr. 24, 1990

[54] FIXED SPIKE OR SLEEVE-MOUNTED SPIKE FITTED ON A VEHICLE TIRE

[75] Inventors: Unto Linden, Hämeenlinna; Erkki Suvanto, Porvoo, both of Finland

[73] Assignee: Neste Oy, Finland

[21] Appl. No.: 223,237

[22] PCT Filed: Nov. 17, 1987

[86] PCT No.: PCT/FI87/00155

§ 371 Date: Aug. 17, 1988

§ 102(e) Date: Aug. 17, 1988

[87] PCT Pub. No.: WO88/03877

PCT Pub. Date: Jun. 2, 1988

[30] Foreign Application Priority Data

Nov. 26, 1986 [FI] Finland ............................ 864821

[51] Int. Cl.$^5$ .............................................. B60C 11/14
[52] U.S. Cl. ................................................. 152/210
[58] Field of Search ............... 152/167, 168, 169, 208, 152/209, 210, 211, 212

[56] References Cited

U.S. PATENT DOCUMENTS 3,693,688 9/1972 Schuman ........................... 152/210

FOREIGN PATENT DOCUMENTS

| 1505186 | 5/1969 | Fed. Rep. of Germany . | |
|---|---|---|---|
| 59-202912 | 11/1984 | Japan ........................ | 152/210 |
| 112350 | 12/1967 | Norway . | |
| 204598 | 5/1966 | Sweden . | |
| 204876 | 5/1966 | Sweden . | |
| 214858 | 8/1967 | Sweden . | |
| 227398 | 10/1969 | Sweden . | |

Primary Examiner—Raymond Hoch
Attorney, Agent, or Firm—Steinberg & Raskin

[57] ABSTRACT

The present invention concerns a fixed spike or a sleeve-mounted spike, fitted on a vehicle tire. The flange (12) and the body (11) of the fixed spike or the sleeve-mounted spike (20) or the flange of the rivet and the sleeve, are shaped at least in the part of the flange (12) and of the body part (11) facing the flange (12) or in the part of the flange of the rivet and the sleeve facing the flange of the rivet, in such manner that the fixed spike (10) or the sleeve-mounted spike has no detrimental sharp discontinuities (11d,12d). The rubber (14) is arranged to flow smoothly around the fixed spike (10) or around the sleeve-mounted spike, at least in the region (A) between the flange (12) and the body structure of the tire and in the region (B) of the body part (11) facing the flange (12) or in the region (A) between the rivet flange and the body structure of the tire and in the region (B) of the sleeve facing the flange, whereby forming of air pockets, and at the same time damage to the rubber, can be substantially avoided. In addition, in the region (B) of the body part (11) facing the flange (22) or in the region (B) of the sleeve facing the flange of the rivet, a force better supporting the fixed spike (10) or the sleeve-mounted spike, is at the same time obtained.

4 Claims, 4 Drawing Sheets

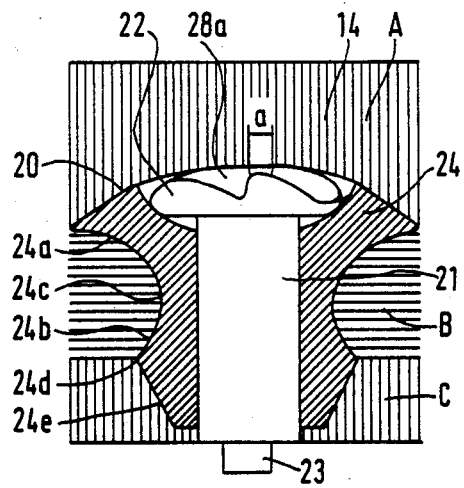
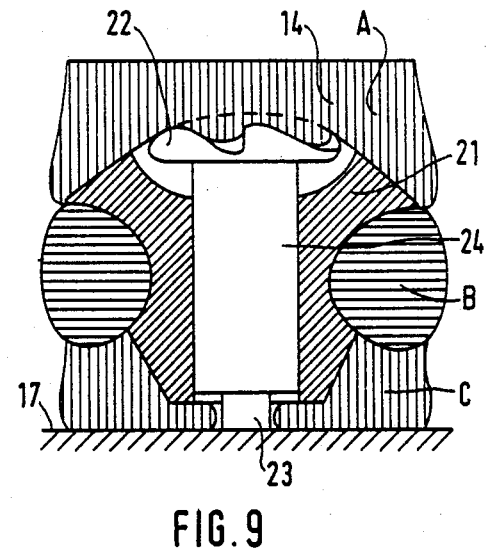
FIG. 8    FIG. 9
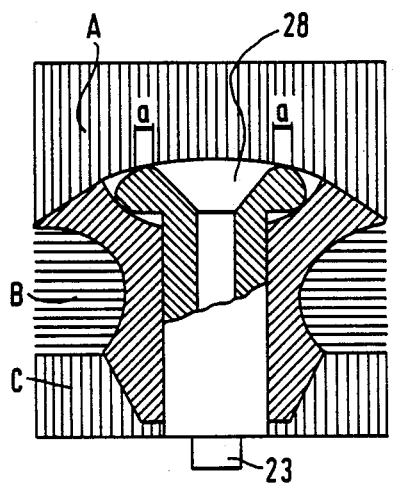
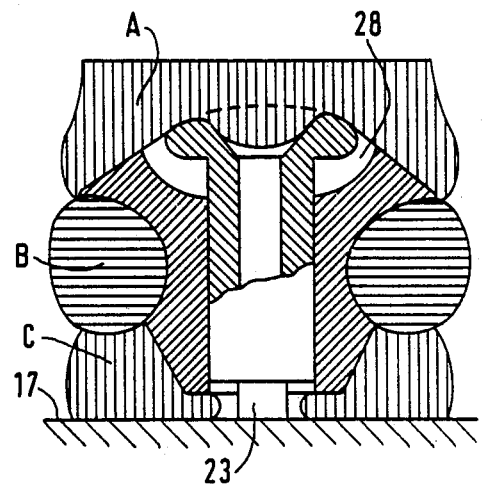
FIG. 10    FIG. 11

FIXED SPIKE OR SLEEVE-MOUNTED SPIKE FITTED ON A VEHICLE TIRE

BACKGROUND OF THE INVENTION

The present invention concerns a fixed spike, or a sleeve-mounted spike, fitted on a vehicle tire.

Increasing traffic load and spike tires in combination have proved to be a remarkable road attrition factor. In some countries this has even led to prohibition of spike tires, or at least to considerable restrictions.

In Nordic conditions, the beneficial effect of anti-slip means on the safety and flexibility of traffic has on the other hand been irrefutably demonstrated, and this effect should not be sacrificed: instead, the drawbacks should merely be eliminated. Good results will be achieved by further developing both the road superstructures and the anti-slip tires.

As a pneumatic automobile tire rolls on an even surface, it is considerably flattened radially, owing to its flexibility, whereby in the contact region longitudinal as well as transversal forces are generated owing to changes of the rolling radius.

The longitudinal forces acting on the spike when the tire is rolling are due to bending of the body structure, to longitudinal slipping and to the stress wave in the rubber. The rubber surface pattern of the tire carries the load so that its internal stress state increases. The rubber material is not compressed, but due to its elasticity it changes shape.

When a spike approaches the point of contact with the road, the tire body undergoes bending such that the radius of the bent part is significantly smaller than that of equivalent parts of the load-free tire. This deflects the spike, which has been mounted at right angles against the surface, to assume a vertical position before the contact with the road. Owing to protrusion of the spike tip, however, the spike is not turned into sufficiently upright position: it meets the road surface in an oblique position. At this stage, the forces due to slipping tendency also begin to exert their influence.

As the rotating tire surface and the protruding fixed body (the spike) attached thereto meet the road surface, the spike is pushed into the rubber material on a length dependent on the hardness of the base; on a hard road super-structure the spike is pressed entirely into the rubber material of the tire, while on softer ice and snow surfaces the tip part of the spike remains outside the wear surface of the tire and causes increase of friction. At the same time, the wear surface pattern composed of rubber material is compressed between the body structure of the tire and the road surface, whereby the rubber material is not compressed, but owing to its elasticity it flows and assumes, as it comes under strain, a configuration different from its original shape. The flowing and deformation of the rubber are determined by the load, the rubber material, the dimensions and configuration of the wear surface, and such solid bodies as are embedded in the rubber.

When the rubber is compressed between the forces acting from opposite directions, the deformation is different in different parts of the wear surface pattern. Since the rubber is firmly fixed to the body structure of the tire and the friction against the road surface prevents any horizontal movement of the wear surface, the rubber is forced to flow towards the free surfaces of the wear surface pattern. The vertical displacements are due to flowing of the rubber under the flange of the spike outwards from the central axis, and to the shape of the spike body and the elastic yielding caused by the load. Since the rubber is not compressed, the vertically directed pressure is converted into displacements in the horizontal plane, as rubber molecules flow past each other towards free surfaces, which bulge outwards as a result. Owing to the configuration of the wear surface pattern and the stress caused by the spike, there remains a neutral region within the pattern element, around the spike, where the movement of the rubber is minimal or there is none at all, unless such movement is caused by the shape of the spike.

Traditionally, in designing anti-slip means the rubber flow is not controlled to support the holding properties of the spike, in addition to which such means of prior art have damaged the rubber material or the body structures of the tire. The shapes have featured sharp edges or detrimental discontinuities, which fray the bonds in the rubber as the rubber material flows past them and owing to the stress state is urged against them, with the result that the spike gets loose and its holding properties deteriorate because of reduced support from the rubber. Detrimental configurations have also been the shapes having two or more flanges in which the rubber flow is improperly prevented so that the rubber material locked between the flange ridges is torn off as a result of excessive shearing stress.

When the spike shape is disadvantageous regarding rubber flow, the slipping of the rubber in particular in the region of the body part of the spike may be so great that it causes strong abrasion of the spike and of the rubber.

In spikes of prior art, the shape of the body is such in some instances that when the spike is pressed into the rubber and the rubber flows into the sharp-bottomed grooves of the body, the rubber simultaneously slides slightly along the spike body towards the flange and causes the spike to rise towards the wear surface of the tyre when the spike returns to its position at rest on termination of road contact. These differentially small slips of the rubber distinctly increase the protrusion of the spike at the initial phase of using such an incorrectly designed spike.

Discontinuities in the shape of the spike in which closed air pockets are formed are likewise detrimental. When the spike is pressed into the tire and the rubber flows into such air pockets, the pressure of the rubber is significantly higher than the air pressure, whereby the air is compressed at each revolution of the tire in rapid impact and is powerfully heated and causes damage to the surrounding rubber.

In conventional spike designs attempts have been made to prevent rotation of the spike around its axis, or no active attempts have been made to do this in any design of prior art. This has resulted in uneven wear of the whole spike, particularly in uneven wear of its hard-metal tip, which in turn has led to weakening of the holding characteristics of the tire during use.

SUMMARY OF THE INVENTION

The aim of the invention is to achieve an improvement of currently known fixed spike designs or sleeve-mounted spike designs. The more specific aim of the invention is to provide a fixed spike or a sleeve-mounted spike, in which the drawbacks impeding designs of prior art have been avoided.

The aims of the invention are achieved by means of a fixed spike or a sleeve-mounted spike, which is characterized in that the flange and body of the fixed spike or of the sleeve-mounted spike or the flange and sleeve of the rivet, are so shaped at least in the part of said flange and in the part of the body part facing the flange or in the part of the rivet flange and in the part of the sleeve facing the rivet flange, that the fixed spike or the sleeve-mounted spike has no detrimental sharp discontinuities, the rubber thus having been arranged to flow smoothly around the fixed spike or the sleeve-mounted spike, at least in the region between the flange and the body structure of the tire, and in the region of the body part facing the flange or in the region between the rivet flange and the body structure of the tyre, and in the region of the sleeve facing the flange of the rivet, whereby forming of air pockets, and simultaneously damage to the rubber, is substantially avoided and, in addition, at the same time a force better supporting the fixed spike or the sleeve-mounted spike can be obtained in the region of the body structure facing the flange or in the region of the sleeve facing the rivet flange.

With the aid of the flow of rubber, the spike is set in slow rotation, whereby its service life increases and its holding properties are permanently good, even in a used spike.

BRIEF DESCRIPTION OF THE DRAWINGS

The invention is described in detail in the following by referring to certain advantageous embodiments of the invention, presented in the figures of the drawing attached, yet to which the invention is not meant to be exclusively confined.

In the drawing,

FIG. 5 presents the fixed spike of FIG. 4, said fixed spike being pushed in;

FIG. 8 presents an advantageous embodiment of the sleeve-mounted spike of the invention, said sleeve-mounted spike being in the state at rest;

FIG. 9 presents the sleeve-mounted spike of FIG. 8, said sleeve-mounted spike being pressed against the road surface;

FIG. 10 presents another advantageous embodiment of the sleeve-mounted spike of the invention, said sleeve-mounted spike being in the state at rest;

FIG. 11 presents the sleeve-mounted spike of FIG. 10, said sleeve-mounted spike being pushed in;

FIG. 12 presents a third advantageous embodiment of the sleeve-mounted spike of the invention, said sleeve-mounted spike being in the state at rest;

FIG. 13 presents the sleeve-mounted spike of FIG. 12, said sleeve-mounted spike being pushed in.

DESCRIPTION OF THE PREFERRED EMBODIMENTS

Figure 1:
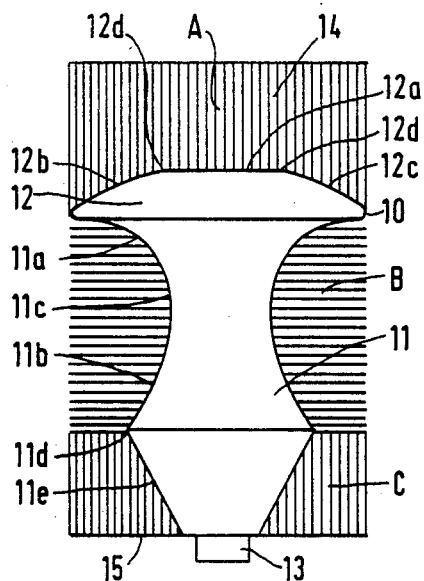
FIG. 1 presents an advantageous embodiment of the fixed spike of the invention, said fixed spike being in the state at rest.
Figure 2:
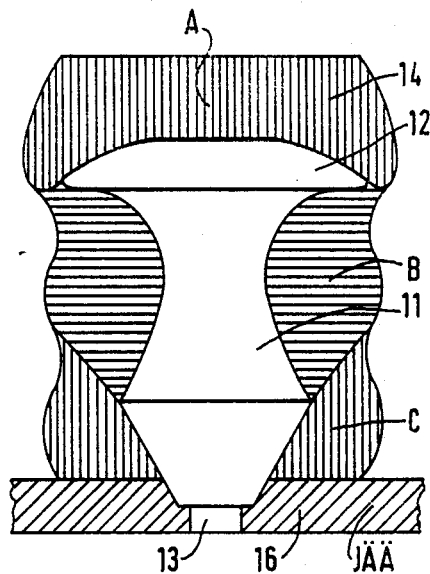
FIG. 2 presents the fixed spike of FIG. 1, when said fixed spike has entered an ice surface.
Figure 3:
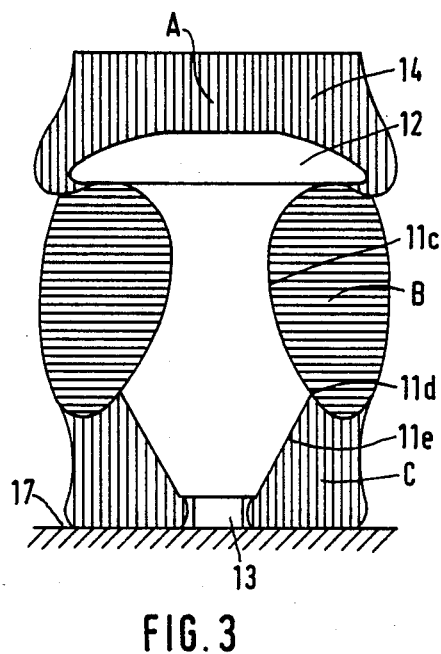
FIG. 3 presents the fixed spike of FIG. 1, this fixed spike being pressed against the road surface.

In FIGS. 1-3, the fixed spike is in general indicated by reference numeral 10. The fixed spike 10 is composed of a body part 11, a flange part 12 and a tip 13. The rubber of the vehicle tire is indicated by reference numeral 14, and the wear surface of the tire by reference numeral 15. Each part of the fixed spike 10 may be composed of one or several parts or materials. The rubber of the vehicle tire, between the flange 12 and the body structure of the tire, is indicated by A. The rubber around the body part 11 is indicated by B, and the rubber around the tip part 11e of the body part 11, by C.

As taught by the basic idea of the invention, the flange 12 of the fixed spike 10 is shaped to be curved so that the flow of rubber from under the flange 12 takes place smoothly in conjunction with the pushing-in of the spike. The flange 12 may have a level region 12a and curved regions 12b,12c with different radii, however with the provision that there must be no sharp edges at the points 12d where they come together. The shape of the spike body 11 is curvedly tapering downwards from the root of the flange 12 so that the rubber will be shaped to conform to the radius of curvature of the spike at installation and no harmful air pockets are formed at the root of the flange 12. Below the tapering part 11a the spike body widens again, either curvedly or conically, 11b. so that a contraction inward curvature 11c is produced substantially in the central area and, thereunder, a widening 11d, which is advantageously flange-like. The tip part 11e of the spike is tapering, preferably conically, towards the tip and terminates in a hard-metal or equivalent tip 13. The contraction 11c is located in the so-called neutral area of the wear surface pattern, where the slipping between the rubber and the surface of the spike 10 is minimal or there is no slipping.

The fixed spike 10 of the invention functions in the tire in the manner presented in FIG. 2. In FIG. 2, the spike has penetrated into an ice surface 16, the rubber under the flange 12 is stressed owing to the weight of the vehicle and is mainly responsible for driving the spike tip 13 into the ice surface 16. At the same time while elastically yielding, the rubber material has flowed over the edges of the flange 12. Similarly, the rubber in the region C of the tip part 11e has become stressed and has slid past the widening of the tip part of the spike. The stress in the rubber in the central region B of the spike has also increased, and with the aid of the rubber flowing at the flange 12 and at the tip part 11e, the stress is directed to the root of the flange 12 and to the region of the contraction 11c in the middle. Therefore, an effect supporting the spike is produced by the rubber flow.

When the spike tip 13 pushes against an ice-free road surface 17, as shown in FIG. 3, the penetration of the spike into the rubber 14 is greater than in the instance just described. The quantity of rubber offset from under the flange 12 is greater and the flow extends past the flange 12. The rubber at the contraction 11c in the central region B does not slide on the surface of the spike and rises instead upward with the spike. The rubber C in the tip region 11e slides downwards on the spike surface, and more rubber from the center region B and from the sides flows into said region C.

Figure 4:
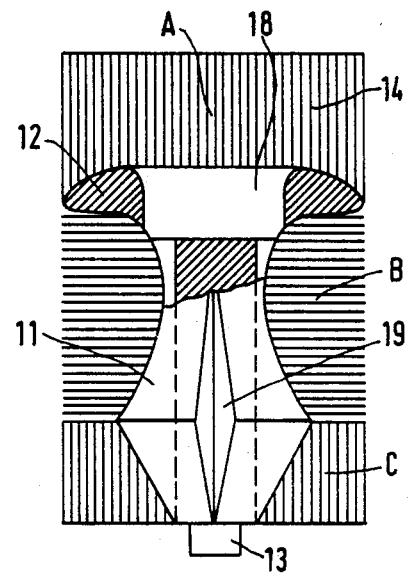
FIG. 4 presents another advantageous embodiment of the fixed spike of the invention, with said fixed spike in the state at rest.
Figure 5:
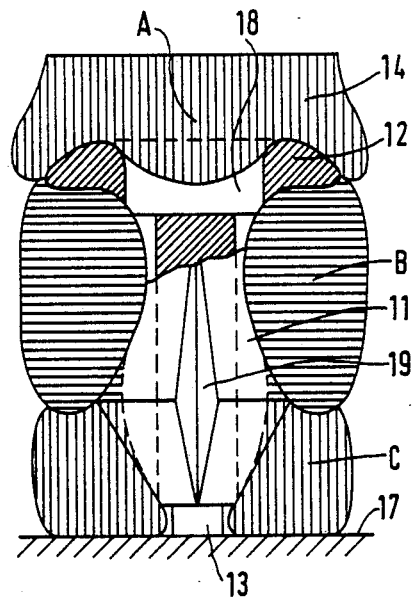
Figure 6:
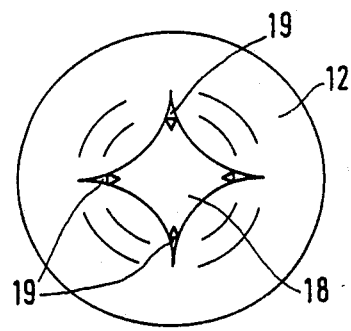
FIG. 6 presents the fixed spike of FIG. 4 in a projection from above.

The flow of rubber from under the flange 12 can be guided to go also into the flange 12, as shown in FIGS. 4 to 6. Part of the rubber A above the flange 12 flows into a depression 18 in the flange 12, this depression being ventilated through grooves, or ventilation passages, 19 in the body part 11.

Figure 7:
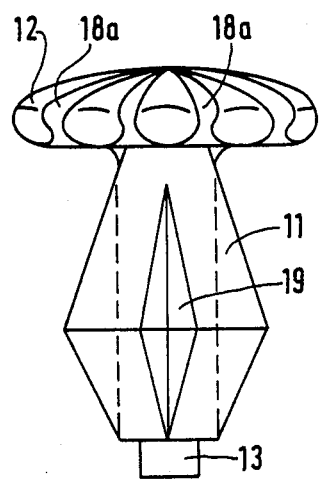
FIG. 7 presents a third advantageous embodiment of the fixed spike of the invention.

The shapes of the parts of the fixed spike 10 controlling the flow of rubber may be made groove-like, as in FIG. 7, whereby the slipping of rubber on the spike surface becomes less and the flow distance will be shorter. This improves the durability of the spike 10 in the tire. In FIG. 7, the groove-like depressions in the flange 12 are indicated by reference numeral 18a.

Figure 7A:
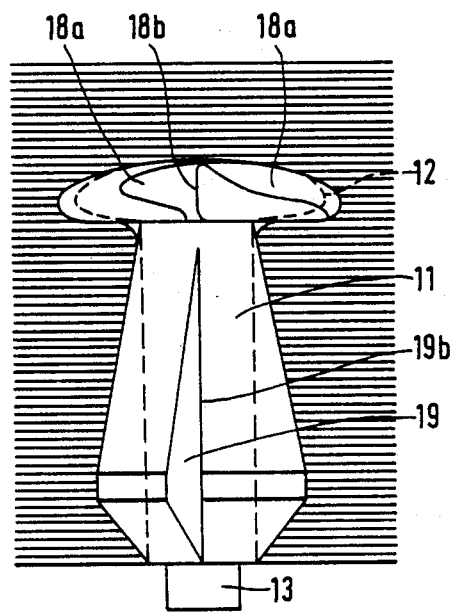
FIG. 7a presents an advantageous modification of the fixed spike of FIG. 7.

The rotation about its principal axis of the spike during road contact, produced by the aid of rubber flow, is presented in FIG. 7a. The grooves 18a in the flange and in the body controlling the rubber flow have been made asymmetrical so that stretching and slipping on the spike surface ensue on the side of the steep face 18b of the groove when rubber flows to the groove bottom under prevailing stress. The stretching produces a rotating force when the spike returns to its state at rest after road contact. Similarly, the ventilation passage 19 may be made asymmetrical. The steep side of the ventilation passage 19 is indicated by reference numeral 19b.

In FIGS. 8 and 9, the sleeve-mounted spike in general is indicated by reference numeral 20. The sleeve-mounted spike 20 consists of a rivet 21, of a flange 22 of the rivet 21, of a tip 23, and of a sleeve 24. The flange 22 of the rivet 21 is supported by the sleeve 24 and may be installed partly inside the sleeve 24. The spike 20 of the invention, or parts thereof, may be composed of several parts or materials.

As taught by the basic idea of the invention, the flange 22 of the rivet 21 is so shaped to be curved that the rubber flow from under the flange takes place smoothly in conjunction with the pushing-in of the rivet 21. The spike of the invention functions in the tire in the manner presented in FIGS. 8 and 9. In FIG. 8 the sleeve-type spike 20 is in its state at rest. After installation, the rubber 14 is stressed around the sleeve 24 and touches the rivet 21 on the ridge parts a of its flange 22. When the spike 20 meets a hard road surface 17, the rivet 21 penetrates into the rubber material close to the cord structure of the tire, and rubber flows away from the flange 22 in the region A. The shape of the flange 22 of the rivet 21 directs the rubber flow in the present instance so that the rubber enters the grooves 28a in the flange 22 of the rivet 21 and partly flows outwards from the central axis of the rivet 21. The asymmetric shape of the ridge a causes stretching of the rubber on the steep side of the ridge a, and this stretching elicits a minimal rotation as the spike return to its position at rest after road contact. Owing to the stressing of the rubber, the sleeve 24 ascends somewhat, and at the rivet 21 and at the flange, in the region A, rubber flows around the flange of the sleeve 24 in the manner shown in FIG. 9. The rubber in the central region B of the body is stressed by the weight of the vehicle and under pressure from the rubber that has flown from under the flange 22 and the flange of the sleeve 24, and it supports the entire spike, over the flange 24. The rubber in the tip region C of the sleeve 24 flows slightly downwards in this instance, and more rubber is pushed from the side by the pressure due to the weight of the vehicle into this region C, so that the sleeve 24 assumes a floating position inside the rubber, conforming to its movements. Owing to the weight of the vehicle, the stressed rubber in the region A, which has entered the groove-like, or equivalent, configurations 28a of the flange 22 of the rivet 21, produces an adequate pushing force for the tip 23 to be pushed into the ice surface in the holding situation of the spike.

The flow of rubber 14 into depressions 18a, 28a on the fixed spike 10 or on the sleeve-mounted spike 20 respectively, is arranged to produce a force rotating the spike.

Figures 12, 13:
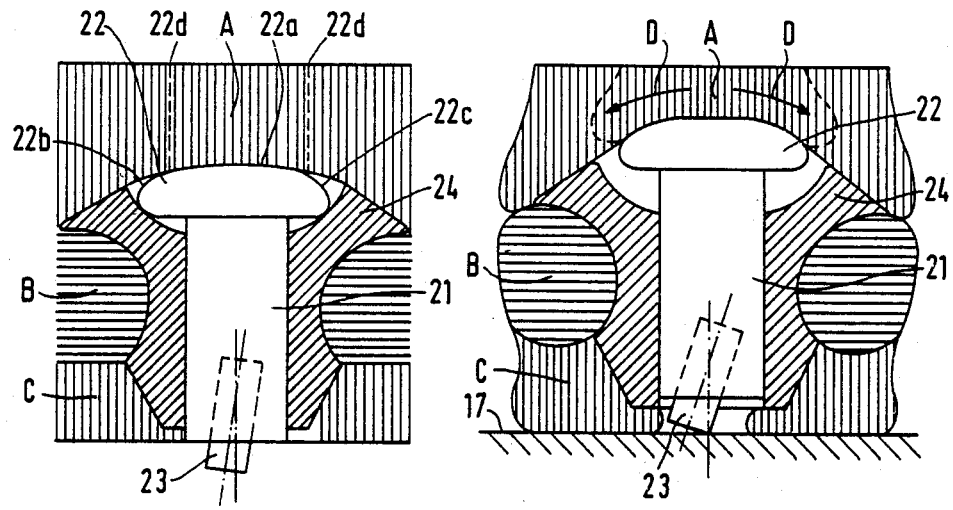

The flange 22 may present a level area 22a and curved regions 22b, 22c with different radii, however so that no sharp edges are formed at the tips 22d where they join, as FIGS. 12 and 13 show. The sleeve 24 constitutes a flange around the rivet 21. The sleeve 24 has been formed, starting at the root of the flange, to be curvedly 24a, or conically, tapering so that in conjunction with installation the rubber 14 is moulded to conform to the radius of curvature of the spike. Below the tapering part 24a, the sleeve section again widens either curvedly 24b or conically so that substantially in the central region a contraction 24c is formed, and therebelow a widening 24d. The tip part 24e of the sleeve 24 is tapering, preferably conically, towards the tip 23 of the spike, and from its end facing the road protrudes the tip part of the rivet 21. The movement of the rivet 21 in relation to the sleeve 24 may be limited. The contraction 24c is located in the neutral region of the wear surface pattern.

The flow of rubber from below the flange 22 of the rivet 21 can be controlled to take place outwards from the central axis of the rivet 21, as shown in FIGS. 12 and 13. In FIG. 13, said flow is indicated by arrows D.

Figure 14:
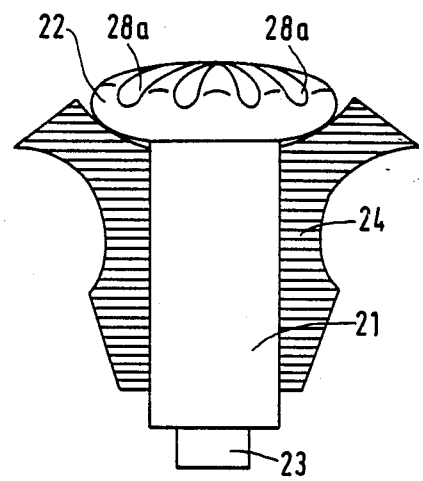
FIG. 14 presents a fourth advantageous embodiment of the sleeve-mounted spike of the invention.

A recess 28 may be provided in the flange 22, into which the rubber flow is directed as in FIGS. 10 and 11, or in the flange 22 groove-like grooves 28a of various shapes may be provided to guide the flow of the rubber, as shown in FIG. 14.

Making use of the rubber flow, the rivet 21 is set in rotation, whereby the shape of the tip 23 of the spike is kept efficient throughout the service life of the spike. In FIGS. 8 and 9 is presented one shaping of the spike implementing such rotation.

The force rotating the rivet may also be produced in that, as in FIGS. 12 and 13, the hard-metal alloy tip 23 of the rivet 21 or equivalent is installed in oblique position with reference to the principal axis of the spike, or parallelling the principal axis but eccentrically so that the torque between the asymmetrical axes, which continuously changes direction at slipping in different directions, produces a force rotating the rivet 21. The tip 23 of the rivet 21 of the sleeve-mounted spike 20 is disposed to be asymmetrical with reference to the axial direction of the spike, and arranged to produce a force rotating the spike. The shaped parts of the fixed spike 10 or of the sleeve-mounted spike 20 are arranged to produce, at the same time, a ventilation passage or passages 19 which enable air flow past the spike.

In the foregoing are presented only some advantageous embodiments of the invention, and it is clear to a person skilled in the art that numerous modifications thereof are feasible within the scope of the inventive idea set forth above.

We claim:

1. A fixed spike fitted in a vehicle tire and comprising a body and a flange mounted on said body, a part of said body facing said flange having an inward curvature such that said flange and at least said part of said body facing said flange have no detrimental sharp discontinuities, and rubber of the tire is arranged to flow smoothly around said spike at least in a first region between said flange and said body of the tire and in a second region of said body part facing said flange, said flange comprising depressions arrange such that flow of the tire rubber thereinto produces a force rotating said spike, whereby formation of air pockets and simultaneously damage to said tire rubber can be substantially avoided, and additionally, at the same time, a force can be produced which better supports said spike in said second region.

2. A sleeve-mounted spike fitted in a vehicle tire and comprising a sleeve and a rivet positioned in said sleeve and having a flange mounted thereon, a part of said sleeve facing said flange having an inward curvature such that said flange and at least said part of said sleeve facing said flange have no detrimental sharp discontinuities, and rubber of the tire is arranged to flow smoothly around said sleeve-mounted spike at least in a first flow region between said flange and the body structure of said tire and in a second region of said sleeve part facing said flange, said flange comprising depressions arranged such that flow of the tire rubber thereinto produces a force rotating said spike, whereby formation of air pockets and simultaneously damage to the tire rubber can be substantially avoided and additionally, at the same time, a force can be produced which better supports said spike in said second region.

3. A sleeve-mounted spike fitted in a vehicle tire and comprising a sleeve and a rivet positioned in said sleeve and having a flange mounted thereon, a part of said sleeve facing said flange having an inward curvature such that said flange and at least said part of said sleeve facing said flange have no detrimental sharp discontinuities, and rubber of the tire is arranged to flow smoothly around said sleeve-mounted spike at least in a first flow region between said flange and said body of said tire and in a second region of said sleeve part facing said flange, wherein said rivet comprises a tip situated at an end thereof opposite said flange and asymmetrically-disposed with respect to an axial direction of said spike, thereby arranged to produce a force rotating said spike, whereby formation of air pockets and simultaneously damage to the tire rubber can be substantially avoided and additionally, at the same time, a force can be produced which better supports said spike in said second region.

4. A fixed spike fitted in a vehicle tire and comprising a body and a flange mounted on said body, a part of said body facing said flange having an inward curvature such that said flange and at least said part of said body facing said flange have no detrimental sharp discontinuities, and rubber of the tire is arranged to flow smoothly around said spike at least in a first region between said flange and said body of the tire and in a second region of said body part facing said flange, wherein said body comprises a tip situated at an end thereof opposite said flange and and asymmetrically-disposed with respect to an axial direction of said spike, thereby arranged to produce a force rotating said spike, whereby formation of air pockets and simultaneously damage to the tire rubber can be substantially avoided and additionally, at the same time, a force can be produced which better supports said spike in said second region.

* * * * *